Figure 1:
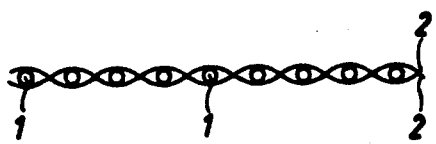

United States Patent [19]

Heeke

[11] 4,094,402
[45] June 13, 1978

[54] INLAY FABRIC

[75] Inventor: Hugo Heeke, Hamburg, Germany

[73] Assignee: Conrad Scholtz AG, Hamburg, Germany

[21] Appl. No.: 680,693

[22] Filed: Apr. 27, 1976

[30] Foreign Application Priority Data

Apr. 30, 1975 Germany .............................. 2519448

[51] Int. Cl.² ............................................ B29H 9/02
[52] U.S. Cl. .................................... 198/847; 428/212;
428/245; 428/246; 428/250; 428/252; 428/258;
428/369
[58] Field of Search ............... 428/212, 224, 225, 231,
428/226, 229, 245, 246, 247, 257, 258, 259, 250,
252, 369; 198/846, 847; 139/420 R

[56] References Cited

U.S. PATENT DOCUMENTS

| 1,457,892 | 6/1923 | Blackwelden | 428/259 |
| 2,064,781 | 12/1936 | Collins | 428/258 |
| 2,202,013 | 5/1940 | Lougheed | 428/259 |
| 2,425,575 | 8/1947 | Suloff | 428/258 |
| 3,154,459 | 10/1964 | Cranston | 428/259 |
| 3,296,062 | 1/1967 | Truslow | 428/257 |
| 3,446,252 | 5/1969 | Maxham | 428/259 |
| 3,509,006 | 4/1970 | Baxendale et al. | 428/258 |
| 3,606,914 | 9/1971 | Maiwald et al. | 139/420 R |
| 3,941,162 | 3/1976 | McCabe et al. | 428/258 |

FOREIGN PATENT DOCUMENTS

| 2,029,870 | 12/1971 | Germany | 428/258 |
| 1,108,132 | 4/1968 | United Kingdom | 428/259 |

Primary Examiner—James J. Bell
Attorney, Agent, or Firm—Milton M. Field

[57] ABSTRACT

An inlay fabric for transversely stiff conveyor belts having warp threads to be arranged in longitudinal direction of the conveyor belt and relatively stiff weft threads extending transversely thereof. The weft threads have a diameter in the range from 0.2 to 1.0 mm, the density of the weft threads ranges from 60 to 120 threads per 100 mm of fabric length, and the warp threads have a crimp between 6.5 and 22.5%, whereby the inlay fabric has relatively great transverse stiffness together with low longitudinal stiffness and at the same time is suitable to accomodate tensile forces in longitudinal direction.

11 Claims, 2 Drawing Figures

INLAY FABRIC

The invention relates to an inlay fabric for transversely stiff conveyor belts having warp threads to be arranged in longitudinal direction of the conveyor belt and relatively stiff weft threads which extend transversely of the warp threads.

It is known to render conveyor belts stiff in transverse direction by embedding relatively stiff transverse elements, such as metal cables in the belt body. If such stiff transverse elements are disposed singly in the belt body, there is the risk that they separate from the composite belt body structure in operation. Besides, the production of a conveyor belt with singly placed transverse elements is very costly because the conventional method of processing only continuous inlays in longitudinal direction, in particular fabric inlays cannot be applied.

To obviate the latter difficulty it has already been proposed to process the stiff transverse elements into a fabric, using them as weft threads, or to incorporate them in a structure similar to a fabric which is then used as the continuous inlay in the manufacture of transversely stiff conveyor belts. Yet the transverse stiffness thus obtainable is not very great because with classical methods of producing fabrics there is a limit to the thickness and rigidity of the yarns which can be woven as weft. A further difficulty stems from the fact that by linking the transverse elements as wefts in a yarn structure an undesired longitudinal stiffness in the direction of the warp threads cannot be avoided, especially not if the fabric is designed in conventional manner to take up conveyor belt tensile forces in warp direction. If the longitudinal stiffness is increased, however, the return drums or pulleys must have greater minimum diameters than with the usual conveyor belts and the formation of pleats due to upsetting is enhanced.

In recognition of this disadvantage it has become known to process relatively stiff weft threads, which produce transverse stiffness, into special fabrics having warp threads which are capable of being stretched and practically cannot accommodate any tensile forces. These special fabrics are then used in addition to conventional fabrics taking up tensile forces in the structure of a transversely stiff conveyor belt. It is thus possible to obtain good transverse stiffness without unusually high longitudinal stiffness because the special inlays, for having stretchable warps, can be arranged outside of the neutral zone of the conveyor belt without affecting the longitudinal stiffness. In connection with a relatively hard elastomeric core layer in the neutral zone they afford particularly good transverse stiffness. However, the increased expenditure for at least one additional special fabric and the rather complicated, often also unsymmetric layer structure of the conveyor belt are opposed to that.

It is an object of the present invention to provide an inlay fabric for conveyor belts which permits manufacture of conveyor belts without any increase in the usual manufacturing expenditure for fabrics and conveyor belts.

It is another object of the invention to provide an inlay fabric for conveyor belts which will have great transverse stiffness without suffering, at the same time, an increase of their longitudinal stiffness.

According to the invention, starting from an inlay fabric of the kind specified, the relatively stiff weft threads of the inlay fabric have a diameter ranging from 0.2 to 1.0 mm., the density of the weft threads ranges from 60 to 120 threads per 100 mm. of fabric length, and the warp threads have a crimp which ranges from 6.5 to 22.5%. Preferred values for the diameter, density of weft threads, and crimp are 0.4 mm., 80 threads per 100 mm. of fabric length, and 18%, respectively. And it is especially preferred to use these preferred values at the same time.

As is known, the extensibility of a fabric in warp direction is determined by the material stretching which is specific of the substance and by the structural stretching which is permitted by the undulated arrangement of the warp threads with respect to the weft threads. The structural stretching is defined by the so-called crimp which refers to the difference between the length of woven warp yarn and the length of extended warp yarn (excluding weft yarn) in percent based on the length of woven warp yarn. Consequently the decisive factors for the crimp are the diameter, density, hardness, and stiffness of the weft threads.

With an inlay fabric according to the invention, surprisingly, great transverse stiffness was obtained simultaneously with low longitudinal stiffness due to a useful, correctly harmonized combination of the values for weft diameter, weft density, and crimp, and yet the inlay fabric was still suitable to accommodate tensile forces. This permits the construction of transversely stiff conveyor belts which do not require any special inlays for taking up tensile forces, apart from one or several inlays of the fabric according to the invention, and therefore can be produced at very low costs. Furthermore, inlays of the novel fabric can be processed in the same manner as conventional fabric inlays as regards their arrangement in the conveyor belt. This also facilitates their manufacture and always permits a symmetric belt structure. When two inlays are provided, the conventional structure may be departed from in that those two inlays are positioned at greater spacing from each other than usual in the direction of the thickness of the conveyor belt in order to further increase the stiffening effect in transverse direction. Such an arrangement outside of the neutral zone of the conveyor belt is readily possible with the novel fabric, without the tendency to pleat formation due to upsetting becoming critical.

The greater the crimp, the smaller the diameters of the return drums may be which are still suitable for use with a conveyor belt incorporating the novel fabric inlay. On the other hand, in the interest of good tensile strength the crimp is chosen to be only so great as required for a certain drum diameter. The above mentioned, particularly preferred combination of parameters is especially adapted in this respect to the conditions most frequently met in practice.

The combination of parameters which is characteristic of the novel inlay fabric makes it necessary for the weft threads to have no more than little crimp. The properties defined of the novel inlay fabric are best if the weft threads do not display any crimp at all, a circumstance obtainable by giving them an appropriate rigidity. It is a condition for the particularly preferred combination of parameters, for instance, that the weft threads have no crimp. As a rule, the weft yarn will be synthetic yarn because of the required rigidity.

Synthetic monofilaments are advantageously used as weft material in order to keep the crimp of the warp constant since they suffer practically no deformation under compressive or tensile stress.

The ratio between transverse stiffness and longitudinal siffness is especially great with the novel fabric inlay if it is designed for the lower range of tensile strength, by proper selection of its warp threads. This range refers to a tensile strength of up to 200 kp/cm. of fabric width and layer, preferably of 100 kp/cm. of fabric width and layer. This makes the novel fabric inlay especially suitable for the construction of lighter conveyor belts which comprise one or two inlays of the novel fabric.

The manufacture of the novel fabric itself presents absolutely no problem. Weft yarns of a diameter which is suitable for the fabric can be processed without difficulty on looms of more recent type operating according to the gripper principle. Suitable warp yarns are those which are customary for conveyor belt fabrics, in particular cotton or polyester yarns. All the known measures for improving the adherence between fabric and embedding elastomer of the conveyor belt may be applied readily.

Figure 2:
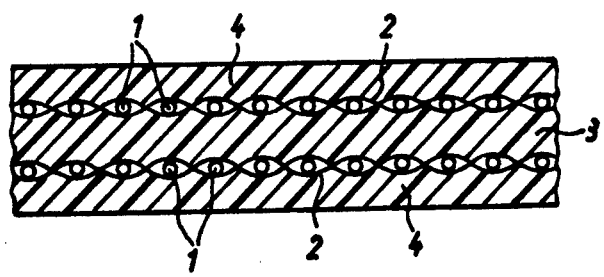

The invention will be described further, by way of example, which reference to the accompanying drawings, which illustrate the best mode contemplated for this invention at the time of preparation of this description and in which FIG. 1 is a diagrammatic sectional view of an inlay fabric according to the invention, taken in weft direction, FIG. 2 is a diagrammatic longitudinal sectional view of a conveyor belt incorporating inlay fabrics according to the invention.

FIG. 1 shows an embodiment of an inlay fabric according to the invention woven of weft threads 1 and warp threads 2 in basket weave. The weft threads 1 are polyester monofilaments and have a diameter of 0.4 mm. The warp threads are polyester filaments having a tensile strength which will render a fabric whose tensile strength in warp direction is 100 kp/cm. of fabric width. The weft threads 1 have no crimp, and their density in the fabric is 80 threads per 100 mm. of fabric length. The warp threads have a crimp of 18%.

FIG. 2 is a longitudinal sectional elevation of part of a conveyor belt comprising two inlay fabrics according to FIG. 1. The two inlay fabrics which are made of wefts 1 and warps 2 are embedded in conventional manner in an elastomer, such as rubber. They are disposed symmetrically with respect to a rubber core layer 3 and are each covered by a cover layer 4.

It will be understood that while the invention has been shown and described in a preferred form, changes may be made without departing from the scope of the invention as defined in the following claims.

What is claimed is:

1. A conveyor belt which is transverely stiff, has low longitudinal stiffness, and is capable of accommodating tensile forces, comprising, in combination, an elastomer and an inlay fabric embedded within said elastomer, said inlay fabric comprising:

warp threads to be arranged longitudinally of the conveyor belt; and relatively stiff weft threads extending transversely of the warp threads, said weft threads having a diameter in the range of 0.2 mm. to 1.0 mm., the density of said weft threads ranging from 60 to 120 threads per 100 mm. of fabric length, and said warp threads having a crimp between 6.5% and 22.5%.

2. A conveyor belt according to claim 1, wherein the weft threads have no crimp.

3. A conveyor belt according to claim 1, wherein the weft threads are synthetic monofilaments.

4. A conveyor belt according to claim 1, wherein the weft threads of a diameter of 0.4 mm.

5. A conveyor belt according to claim 1, wherein the density of the weft threads is 80 threads per 100 mm of fabric length.

6. A conveyor belt according to claim 1, wherein the warp threads have a crimp of 18%.

7. A conveyor belt according to claim 1, wherein the warp threads are so selected that the fabric will have a tensile strength up to 200 kp/cm of fabric width.

8. A conveyor belt according to claim 7, wherein the warp threads are so selected that the fabric will have a tensile strength of 100 kp/cm of fabric width.

9. A conveyor belt as recited in claim 1, wherein said weft threads have no crimp and have a diameter of 0.4 mm., the density of said weft threads is 80 threads per 100 mm. of fabric length, and said warp threads have a crimp of 18%.

10. A conveyor belt according to claim 9, wherein the weft threads are synthetic monofilaments.

11. A conveyor belt according to claim 9, wherein the warp threads are so selected that the fabric will have a tensile strength of 100 kp/cm of fabric width.

* * * * *